United States Patent [19]

Schmerda et al.

[11] Patent Number: 4,873,453

[45] Date of Patent: Oct. 10, 1989

[54] DC MOTOR SPEED CONTROLLER HAVING PROTECTION

[75] Inventors: Richard F. Schmerda; James E. Hansen, both of Oak Creek, Wis.

[73] Assignee: Eaton Corporation, Cleveland, Ohio

[21] Appl. No.: 238,447

[22] Filed: Oct. 19, 1988

Related U.S. Application Data

[62] Division of Ser. No. 114,348, Oct. 27, 1987.

[51] Int. Cl.[4] ............................................. H01H 83/12
[52] U.S. Cl. .................................... 307/130; 307/112; 318/434; 318/599; 388/903
[58] Field of Search ....................... 307/112, 116, 130; 388/819, 821, 822, 824, 831, 833, 903; 318/434, 599; 320/9, 13, 39, 48

[56] References Cited

U.S. PATENT DOCUMENTS

| | | |
|---|---|---|
| 3,874,743 | 4/1975 | Fleischer et al. ...................... 303/92 |
| 3,995,912 | 12/1976 | McNinch; Jr. et al. ............... 303/92 |
| 4,186,315 | 1/1980 | Benton ................................. 307/117 |
| 4,227,127 | 10/1980 | Fukaya et al. ....................... 388/821 |
| 4,511,890 | 4/1985 | Kouzai et al. .................. 307/130 X |
| 4,618,780 | 10/1986 | Ikoma et al. ......................... 307/130 |

*Primary Examiner*—Bentsu Ro
*Attorney, Agent, or Firm*—C. H. Grace

[57] ABSTRACT

A controller for a batter-drive DC motor controls the average motor current by switching a series-connected FET on and off with a pulse-width-modulated gate signal. Motor speed is changed by chaning the duty cycle of the signl, which is generated by an oscillator. An undervoltage protection circuit senses the battery voltage and compares it with a reference system that has hysteresis. An overload protection circuit senses the motor current, integrates the sensed signal, and comprares the result with a Zener reference diode that is connected in an amplifier circuit for positive feedback. The oscillators's pulse-width-modulated output, the undervoltage protection circuits's output, and the overload protection circuit's output are input to a "NOR" Logic gate, whose output drives the gate of the FET.

2 Claims, 1 Drawing Sheet

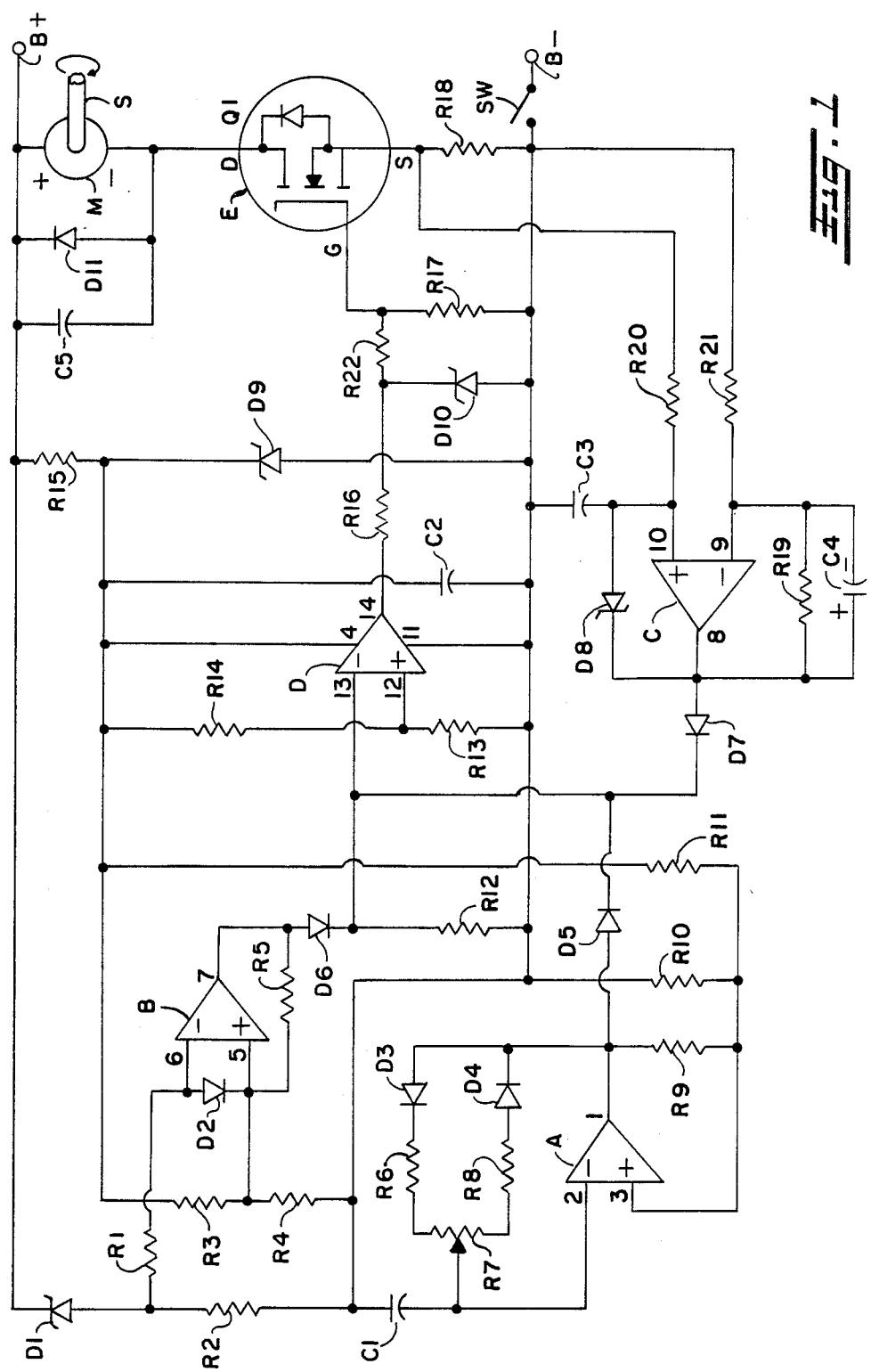

DC MOTOR SPEED CONTROLLER HAVING PROTECTION

This is a division application of pending prior application Ser. No. 114,348 filed on Oct. 27, 1987 of Schmerda, et al. for DC MOTOR SPEED CONTROLLER HAVING PROTECTION.

BACKGROUND OF THE INVENTION

The field of the invention is the control of DC motors, such as battery-driven motors for medium power and high power Portable tools. Protection from excessive motor current is desirable to prevent damage to the motor and its speed control device. Protection is also desirable against operation with very low battery voltage, which could result in damage to the battery or excessively long battery recharging time.

SUMMARY OF THE INVENTION

An object of the invention is to provide speed control apparatus that is responsive to the position of a hand operated speed lever such as the "trigger" of a power drill, to control the speed of a DC motor, by pulse width modulation control of the motor current.

Another object is to provide speed control apparatus having an undervoltage protection system that stops the current to the motor when the voltage of the power source such as a battery declines below a predetermined threshold, and which has hysteresis with a different threshold voltage for restarting than for shutting off.

Another object is to provide speed control apparatus having a protection system that prevents latch-up or damage to its undervoltage protection circuits when the battery voltage is very high, as might be the case with a new or freshly recharged battery.

Another object is to provide speed control apparatus having a protection system that stops the current to the motor when it becomes greater than a predetermined time-integrated threshold value, as might occur during an overload on the tool, and that prevents the motor from restarting until the power to the speed control circuit is turned off, then on again.

Another object is to provide a speed control circuit in which an inverting amplifier senses current overloads and their durations and compares them with a reference in an unusual Zener diode feedback circuit.

BRIEF DESCRIPTION OF THE DRAWING

FIG. 1 is an electrical circuit diagram of the preferred embodiment of the invented apparatus.

DETAILED DESCRIPTION OF PREFERRED EMBODIMENT

As shown in FIG. 1 a DC motor M is mechanically connected by means of a shaft S to a mechanical load such as a tool, which is not shown on the figure. Power for the motor M is provided by a 36 volt battery, not shown, for which positive and negative input terminals at the controller are denoted B+ and B− respectively. The speed of the motor is controlled by rapidly switching its current on and off by means of a metal-oxide semiconductor field effect transistor (MOSFET) Q1. MOSFET Q1 is controlled by an AC signal of constant frequency, whose duty cycle, i.e., the ratio of ON time to OFF time, is adjustable.

The controller comprises five subcircuits, namely: (A) Pulse Width Modulation Oscillator. (B) Undervoltage Protection Circuit. (C) Overcurrent Protection Circuit. (D) Logic Gate and Buffer. (E) Power Switching Circuit.

(A) Pulse Width Modulation Oscillator.

An operational amplifier A is part of a constant frequency, variable duty cycle square wave oscillator. It generates a signal that is used to pulse width modulate the MOSFET Q1, to provide speed control of the motor M. Other components of the oscillator are resistors R6, R8, R9, R10, and R11, speed control potentiometer R7 (trigger), diodes D3 and D4 and capacitor C1.

Resistors R6 and R8, potentiometer R7 and diodes D3 and D4 provide control of the relative durations of the ON and OFF intervals of the oscillator output at pin 1 of the operational amplifier A. Their duty cycle is set by the position of Potentiometer R7. The values of potentiometer R7 and capacitor C1 control the frequency of oscillation, which is approximately 3 KHz and is essentially independent of duty cycle.

Resistors R6 and R8 set the maximum and minimum possible duty cycles, respectively. Resistors R10 and R11 form a voltage divider between the regulated +24 volts and B−, whose junction provides a voltage reference to the non-inverting input, pin 3. Resistors R9 and R10 form a voltage divider from the output of the operational amplifier A, pin 1, to B−, and their junction also connects to the non-inverting input, pin 3; this reduces the oscillator's susceptibility to noise and provides a more stable output. The voltage at pin 3 is compared with the voltage at the inverting input, pin 2. The voltage at pin 2 is controlled by the charge on capacitor C1, whose other terminal is connected to B−.

The circuit oscillates because capacitor C1 is alternately charged and discharged, through the duty cycle control network, by the output (pin 1) of operational amplifier A. Each charging and discharging interval of C1 ends when the voltage at pin 2 crosses the threshold voltage of pin 3.

When the speed potentiometer R7 is set at one extreme, near R6, capacitor C1 charges relatively rapidly through diode D3 and resistor R6, and discharges relatively slowly through R7, R8 and diode D4. This results in a long duty cycle and a fast motor speed. When R7 is set at the other extreme, near R8, capacitor C1 charges slowly and discharges quickly, Providing a short duty cycle a slow motor speed. Of course, intermediate settings of R7 yield intermediate duty cycles and medium motor speeds.

(B) Undervoltage Protection Circuit.

An operational amplifier B is part of an undervoltage comparator that determines whether the battery voltage is above or below predetermined threshold values. Resistors R1, R2, R3, R4 and R5, and diodes D1 and D2 are other components of the undervoltage sensing circuit. It is an inverting comparator with hysteresis and having protection against its own circuits being damaged by battery overvoltage.

Resistors R3 and R4 are connected as a voltage divider between the regulated +24 volt supply and B−, to establish a reference voltage. Their junction is connected to the non-inverting input, pin 5, of the operational amplifier B. For voltage sensing purposes a sample of the battery voltage is reduced by subtraction by Zener diode D1. Resistor R2 draws enough current through Zener diode D1 to B− to cause D1 to subtract its full rated 15 volts from B+.

When the voltage applied to the inverting input, pin 6, is higher than that at the non-inverting input, pin 5, the output of operational amplifier B, pin 7, goes "low" (to a low voltage). As will be explained in paragraph D below, this enables the AC signal of oscillator A to reach the power MOSFET Q1, to provide motor speed control.

When the voltage applied to the inverting input is lower than that at the non-inverting input, the battery voltage is so low that an undervoltage signal is produced. The output of the operational amplifier B goes "high", and the power MOSFET Q1 is turned off, preventing the motor from running. Further use of the tool requires recharging or a new battery. The value of the turn-off threshold determines what portion of the battery's ampere-hour capacity is expended before the tool is shut off.

The voltage at the junction of D1 and R2 is usually less than the 24 volts used to power the operational amplifier, but when the battery is very fresh, the battery voltage may be much greater than its nominal 36 volts. It can be as high as 44 volts, which would result in a voltage at R2 so great as to damage amplifier B if it were connected directly to the inverting input terminal 6 of amplifier B. Resistor R1 is connected from R2 to pin 6 to limit the pin 6 current to a harmless 0.1 milliampere level under such conditions.

Diode D2, whose anode is connected to input terminal 6 and cathode to terminal 5, protects the input circuit of the operational amplifier B from overvoltage. The inverting input 6 is never more than 0.7 volt more positive than the non-inverting input. D2 and R1 prevent latch-up or damage to the operational amplifier B.

Resistor R5 is connected from amplifier B's output terminal 7 to input terminal 5 to provide hysteresis; its positive feedback turns the comparator off at a different voltage than that at which it turns on. It has the effect of changing the reference voltage at pin 5 somewhat, in the direction of the output voltage present at pin 7.

The hysteresis prevents noise and loads on the battery from spuriously switching the output of comparator B when the battery voltage is marginal. In this embodiment, 5 volts of hysteresis is provided so that, with a 36 volt battery, the motor has speed control when the battery voltage is 31 volts or above, and is shut off when the battery discharges to 26 volts or below. In the region 26 to 31 volts, the control is on when approached from above 31 volts, and off when approached from below 26 volts.

(C) Overcurrent Protection Circuit

An operational amplifier C is part of an overcurrent sensing circuit, which indicates when the amount of current drawn by the motor M exceeds a predetermined threshold. Other components of the overcurrent circuit are resistors R18, R19, R20, and R21, capacitors C3 and C4, and Zener diode D8. The circuit is an inverting amplifier, which has integration capability, and which acts as a latching comparator.

Resistor R18 is a current sensing resistor, which develops a voltage proportional to the motor current. When motor current is at the threshold of overcurrent shutdown, in this case 12 amperes, R18 provides approximately 100 millivolts of signal. The signal from R18 passes through a series resistor R20 and is received at a non-inverting input terminal 10 of the operational amplifier C. The potential of the B— end of R18 is conducted through resistor R21 to the inverting input terminal 9 of amplifier C. The difference voltage of terminals 9 and 10 is amplified with a voltage gain of about 100, which is determined by the ratio of negative feedback resistor R19 and resistor R21. Resistors R21 and R20 are preferably of the same resistance, to minimize the error voltage due to any offset of input bias currents of the operational amplifier C. The use of a one-stage integrating and latching amplifier circuit to sense motor current in a resistor is unusual. It operates satisfactorily to sense the value of motor current despite the fact that pin 9 cannot be held at B— potential, because the high gain of amplifier C dictates a small value of R21.

Capacitor C3 from pin 10 to B— reduces the amplifier's susceptibility to noise, such as that generated at the motor brushes. Feedback capacitor C4, in parallel with R19, causes the amplifier to act also as an integrator and time delay device. Capacitor C4 prevents noise from tripping the circuit. Also, because of C4, large current surges of short duration, such as motor inrush current upon starting, do not cause nuisance tripping of the overcurrent protection circuit. The values of resistor R21 and capacitor C4 determine the length of time that large current drawn by the motor is ignored. In this embodiment the delay is approximately 0.25 seconds for starting current of the motor.

When the motor current is excessive for a greater time than the normal inrush delay time, the tool has probably been overloaded. Thereupon, the output voltage at pin 8 of the operational amplifier C rises. When the voltage at pin 8 is sufficiently positive, current starts to flow (in the breakdown direction) in Zener diode D8, and input current is supplied to Pin 10. This is the overcurrent sensing threshold, which is affected by R18, the gain of the operational amplifier C (set by the ratio of resistors R19 and R21), and the voltage rating of Zener diode D8. Attention is called to the use of a Zener diode in this way. Once the predetermined overcurrent threshold is reached, diode D8 latches the amplifier C in a highly positive output condition, in the following way.

The feedback to input pin 10 is regenerative, so the voltage at output pin 8 rises toward the +24 volt supply voltage. That disables the AC gate drive to MOSFET Q1, as described below, turning the motor off. Because the feedback current at input pin 10 has latched the amplifier C, the motor current is kept off. The latch of amplifier C can be reset by switching off the power to at least the overcurrent protection Portion of the speed control circuit. In the preferred embodiment, power to the entire circuit is interrupted by a switch SW, FIG. 1, when the manual trigger is completely released. Thereafter, the motor M can be restarted by reapplying power to the speed control circuit via the trigger.

(D) Logic Gate and Buffer.

An operational amplifier D and its associated components form a "NOR" type of logic gate and output buffer to drive the gate G of the power MOSFET Q1. Components associated with amplifier D are resistors R12, R13, R14, R16, R17 and R22, and diodes D5, D6, D7 and D10. The "OR" portion of the logic "NOR" function is provided by diodes D5, D6, D7 and resistor R12.

A "high" output from either pin 1 of the square wave oscillator A, pin 7 of the undervoltage comparator B, or pin 8 of the overcurrent sensing amplifier C, conducts through diode D5, D6, or D7 respectively. It develops a high positive voltage on shunt resistor R12, and that voltage is connected to an inverting input, pin 13, of the operational amplifier D. Amplifier D serves as an inverting comparator, which compares the "OR"ed signal at its inverting input, pin 13, with a reference voltage established by divider resistors R13 and R14 at a non-inverting input, pin 12.

The voltage at pin 13 relative to that at pin 12 is inverted by amplifier D. The resulting inverted "OR" function is equivalent to a "NOR" function. It provides a "low" output at a pin 14 of amplifier D when the voltage at pin 13 is positive with respect to that at pin 12. Pin 13 is more positive than pin 12, irrespective of the output of oscillator A, whenever either amplifier B or amplifier C has a "high" output. Note the use of digital logic signals (received from protection circuits), as inputs to a "NOR" logic circuit, another input of which is a pulse width modulated speed control signal. The logic signals override the speed control when necessary for protection.

The output of the operational amplifier D, pin 14, drives the gate G of the power MOSFET Q1 through series-connected resistors R16 and R22. Zener diode D10, connected from the junction of R16 and R22 to B−, limits the voltage on gate G of Q1 to a maximum of 15 volts, to prevent damage to the MOSFET. Resistor 22 prevents damage to Zener diode D10 in case Q1 becomes damaged.

Resistor R17, connected from gate G to B−, is a pulldown resistor, which ensures that Q1 stays off when the output of operational amplifier D is "low". A "low" signal at gate G turns off the power MOSFET Q1, interrupting current to the motor M, and stopping the tool. Thus the oscillator A controls the speed of the motor only when the battery voltage is sufficient and the motor has not been overloaded.

(E) Power Switching Circuit.

The battery terminal B+ is connected to the positive terminal of motor M1, whose negative terminal is connected to power MOSFET Q1. Q1 is connected through the current sensing resistor R18 to terminal B−. MOSFET Q1 is switched to a conducting or nonconducting state under the control of operational amplifier D, to provide speed control, undervoltage shutoff, and overcurrent shutoff of the motor.

Diode D11, in parallel with the motor, is a flyback diode that provides a path for the discharge of circulating current in the motor when Q1 switches off. Also in parallel with the motor is capacitor C5, which suppresses motor brush noise arising from commutation. It acts in combination with capacitors C3 and C4 to prevent nuisance tripping of the overcurrent shutdown circuit by brush noise.

Power Supply

The power supply voltage for the operational amplifier circuits is at the terminal denoted +24V. A simple shunt regulated Power supply is adequate because the control circuit's currents are small and not greatly variable. Resistor R15, which is connected in series from B+ to +24V, and Zener diode D9, which is connected from +24V− to B−, regulate the voltage. Resistor R15 absorbs the voltage difference between B+ and 24 volts. Capacitor C2, connected from +24V to B−, is a power supply filter for preventing noise and load variations on the battery from affecting the control circuits. The +24 volts is applied at pin 4, and B− is at pin 11 of one semiconductor device package that contains all of the operational amplifiers A, B, C, and D.

The foregoing description of a preferred embodiment is only one illustration of the invention, which can be practiced in many embodiments. The scope of the invention is defined by the claims.

I claim:

1. Speed controller for a DC motor connected in series with a switching device that controls the average DC current of the motor by controlling the switching duty cycle, said switching device having an input control terminal, comprising:

oscillator means for generating an AC signal having controllable duty cycle;

means for communicating said AC signal to said input control terminal of said switching device;

undervoltage protection means for producing an under voltage signal upon occurrence of a low-battery condition below a predetermined threshold voltage level;

override circuit means communicating said undervoltage signal to said input control terminal of said switching device, for turning off said switching device irrespective of the AC signal of said oscillator means upon an undervoltage condition;

and wherein said undervoltage protection means comprises one operational amplifier circuit having;

means for establishing a first battery voltage threshold corresponding to said predetermined threshold voltage level and a second battery voltage threshold which is higher than said first threshold;

means for providing said undervoltage signal when battery voltage is below said first threshold and withholding said undervoltage signal when battery voltage exceeds said second threshold; and, means for providing or withholding said undervoltage signal when the batter voltage is between said first and second thresholds, depending upon whether the battery voltage entered between said thresholds when said undervoltage signal was already being provided on already being withheld, respectively;

whereby said operational amplifier circuit performs both (a) a threshold comparator function and (b) a hysteresis function.

2. A speed controller as in claim 1 and wherein said operational amplifier circuit has an inverting input terminal, a non-inverting input terminal, and an output terminal; and, said undervoltage protection means comprises battery undervoltage sensing means as follows:

Zener diode means for offsetting the battery voltage, connected from a first terminal having the battery voltage of a first polarity to a first resistance whose other end is connected with a second terminal having the battery voltage of the other polarity;

resistor means connected with the junction between said Zener diode and said first resistance for conducting current to the inverting input of said operational amplifier circuit;

diode means connected for conventional current conduction from said inverting input terminal to said non-inverting input terminal;

resistive bias means connected with said non-inverting input terminal for threshold biasing of said non-inverting input terminal; and resistive feedback means connected from said output terminal to said non-inverting input terminal for feeding back hysteresis offset from said output terminal to affect the threshold voltage level of said undervoltage protection means.

* * * * *